E. A. L. ROBERTS.
MANUFACTURE OF NITROGLYCERIN.
No. 112,849. Patented Mar. 21, 1871.
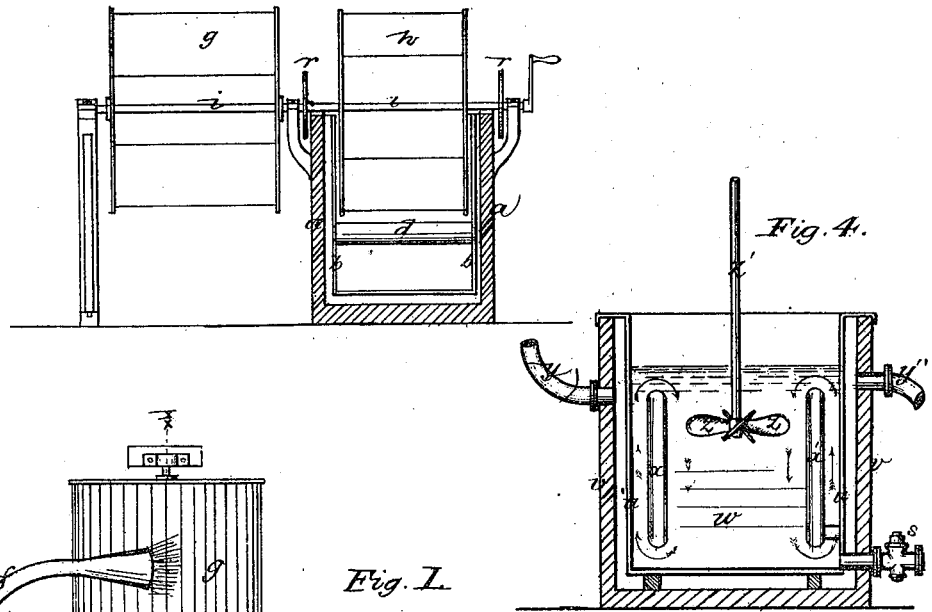
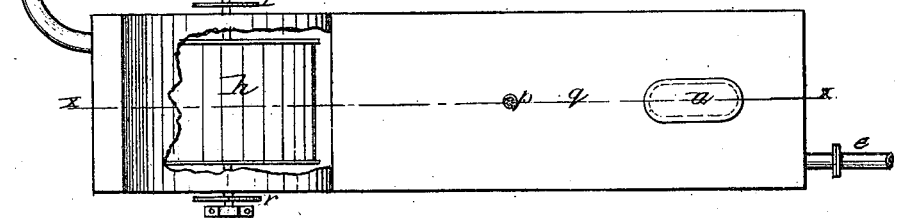
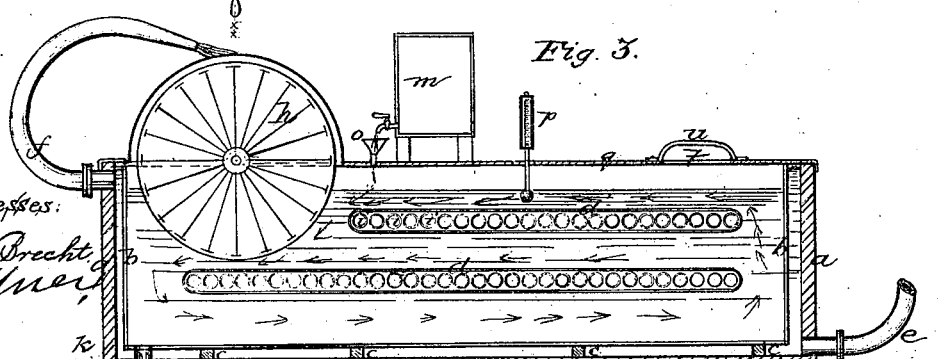

United States Patent Office.

EDWARD A. L. ROBERTS, OF TITUSVILLE, PENNSYLVANIA.

Letters Patent No. 112,849, dated March 21, 1871.

IMPROVEMENT IN THE MANUFACTURE OF NITRO-GLYCERINE.

The Schedule referred to in these Letters Patent and making part of the same.

*To all whom it may concern:*

Be it known that I, EDWARD A. L. ROBERTS, of Titusville, in the county of Crawford and State of Pennsylvania, have invented a new and useful Improvement in the Manufacture of Nitro-Glycerine; and I do hereby declare that the following is a full, clear, and exact description thereof, reference being had to the accompanying drawing forming part of this specification, in which—

Figure 1 is a top view of my apparatus.

Figure 2 is a vertical transverse section through $x-x$, fig. 1.

Figure 3 is a longitudinal vertical section through $x\ x-x\ x$, fig. 1.

Figure 4 is a modification of the apparatus shown in the other figures.

In figs. 1, 2, and 3 like letters of reference denote similar parts of the apparatus.

Nitro-glycerine is made of a mixture of nitric acid and glycerine, and has heretofore been manufactured by pouring the glycerine (of 30° gravity) and mixed acids, composed of one part nitric acid (of 48° gravity) with two and six one-hundredths parts of sulphuric acid, (of 66° gravity—oil of vitriol,) in the proportion of one pound of glycerine to nine pounds of mixed acids, in separate streams of mixed acids and glycerine into water, the streams uniting and forming nitro-glycerine. Other plans of mixing have also been used.

One great disadvantage of these methods is that water is rapidly formed, by the combination of oxygen and hydrogen, in the chemical reaction, and that the nitro-glycerine is apt to decompose by the formation of other chemical combinations, and that a dangerous degree of heat is apt to be generated. There is also a great loss of the acids employed by the dilution effected by pouring them, with the glycerine, into a water-bath.

By my improved process and the apparatus which I employ I secure the combination of a greater proportionate quantity of the glycerine and nitric acid; I preserve a lower and safe temperature; and I also, by dispensing with the water-bath, effect a great saving of the mixed acids.

Another method in use is to pour the glycerine into a bath of mixed acids and agitate the contents by a churning action; but even in this method, although there is not the same loss of acid, there is too great a heat generated and the acid is apt to decompose.

My improvement consists in keeping up a constant and regular circulation of the fluid contents of the vessel in which the nitro-glycerine is made by the pouring of glycerine into a bath of mixed acids, whereby not only is a larger proportionate yield secured, but the temperature is kept at a lower point, and the decomposition of the nitro-glycerine is largely prevented.

To enable others skilled in the art to use my improvement I will proceed to describe the construction of the apparatus which I employ, together with its operation and use.

In the drawing, figs. 1 to 3—

$a$ is a wooden tank, a vessel of any size, according to the capacity desired, preferably of rectangular shape, and capable of holding water.

Inside of this tank $a$ is a leaden mixing-vessel, $b$, of the same shape as the tank $a$, but a little smaller, which is supported by feet, $c\ c$, or otherwise, in such a manner as to leave a water-space all around and under the bottom of the mixing-vessel $b$, so that the leaden mixing-vessel may be surrounded by water, excepting at the top, a space of one or two inches between the tank $a$ and mixing-vessel $b$ being ordinarily sufficient.

One or more flues or diaphragms, $d\ d'$, extend horizontally from side to side of the mixing-vessel $b$, opening with the water-space so that water may flow through it or them.

These diaphragms are made of lead, and, being liable to collapse, are supported by leaden pipes, $i\ i$, placed side by side through the diaphragms, extending across within the diaphragms, and also opening at each end into the water-space of the tank $a$. If preferred, the pipes or tubes $i\ i$ may be used alone in place of the diaphragms.

If more than one diaphragm is used they are placed horizontally one above the other, and a short distance apart.

A water-pipe, $e$, admits a stream of cold water into the tank $a$, outside of the mixing-vessel $b$, at or near the bottom; and an overflow-pipe, $f$, at or near the top, allows the water to escape.

If a sufficient head of water is attainable, the overflow-pipe $f$ passes over an overshot water-wheel, $g$, placed to one side of the tank $a$, which turns the paddle-wheel $h$, attached to the same shaft $j$, which shaft extends through bearings horizontally across the tank, near one end.

The paddle-wheel $h$ dips into the mixing-vessel $b$, and by its revolution creates and sustains a rapid current or circulation of the fluid contents of the mixing-vessel. If the power of the waste water is, for any reason, inapplicable to turning the paddle-wheel, it must be kept in revolution by some prime motor at the rate of about twenty revolutions per minute. The water should flow rapidly through the water-space between the tank $a$ and mixing-vessel $b$ and through the diaphragms $d\ d'$, so as to keep down the temperature of the contents of the mixing-vessel.

A discharge-pipe, $k$, at the bottom of the mixing-vessel $b$, extends through the tank $a$ to the receiving-tank $l$, which contains water, (see fig. 3;) it is furnished with a cock, 22. Through the pipe $k$ the manufactured nitro-glycerine, together with the residual mixed acids, are discharged into the tank $l$, where the acids mix with the water and the nitro-glycerine sinks to the bottom.

A vessel, $m$, containing glycerine, (at about 30° gravity,) is placed conveniently over the mixing-vessel $b$, from which the glycerine is allowed to run in a constant small stream, through a funnel, $o$, into the acids in the mixing-vessel.

A thermometer, $p$, is inserted through the cover $q$ of the mixing-vessel, the bulb extending into the fluid contents of the vessel, so as to indicate the temperature.

On the shaft $j$ of the water-wheel $g$ and paddle-wheel $h$ are placed two disks, $r\ r$, on each side of the paddle, which prevent any of the mixed acids or nitro-glycerine from the mixing-vessel from reaching the journals of shaft $j$.

The mixing-vessel $b$ has a leaden cover, $q$, which extends over the vessel, having a semi-cylindrical projecting cap to cover the paddle-wheel $h$.

An opening in the cover $q$, for inserting the mixed acids into the mixing-vessel $b$, has a separate lid, $u$.

In order to the convenient emptying of the tank, the end at which the discharging-pipe $k$ is situated is set a little (say one inch, more or less) lower than the other end.

The operation of this apparatus, and the process employed by me in the manufacture of nitro-glycerine, is as follows:

The mixing-vessel $b$ is filled to within about three inches from the cover with mixed acids of the strength and in the proportions before stated, the exact proportions stated not being essential, but being such as actual experience has proved to be suitable.

The cold water, being let on through the water-pipe $e$, passes rapidly and constantly through the water-space around the mixing-vessel $b$, and through the diaphragms or pipes $i\ i$.

A small stream of glycerine is allowed to run through the funnel $o$ into the mixing-vessel, and the paddle $h$, creating a constant and rapid current throughout the entire fluid contents of the mixing-vessel, causes the glycerine and mixed acids to flow, in the direction indicated by the arrows in fig. 3, under the paddle $h$, and thence under the diaphragms $d\ d'$, toward the other end of the vessel, where they rise up over the diaphragms, and again passing under the paddle $h$, are thus kept in constant and rapid circulation and become intimately commingled, the glycerine combining with the nitric acid to form nitro-glycerine.

When the charge is thoroughly mixed the contents of the mixing-vessel are run into the receiving-tank $l$, as before stated, where the acids, mixing with the water in the tank, are separated from the nitro-glycerine, which sinks to the bottom.

A modification of my apparatus is shown in fig. 4, consisting of an outer water-tank, $v$, surrounding a leaden mixing-vessel, $w$, with a water-space all around between them.

Diaphragms, $x\ x'$, extend along or across the interior of the mixing-vessel in a vertical position, and communicate at each end with the water-space surrounding it.

An inlet water-pipe, $y$, and an overflow or outlet-pipe, $y'$, serve to furnish a constant current of cold water through the water-space between the water-tank $v$ and mixing-vessel $w$, and through the diaphragms $x\ x'$.

The mixing-tank $w$ has a discharging-cock, $s$, at the bottom.

A revolving paddle, $z$, fixed on a vertical shaft, $z'$, and moved by any convenient means, has its paddles so set as to cause a downward flow of the fluid contents of the mixing-vessel $w$, which pass under the diaphragms $x\ x'$, and thence upward between them and the sides of the mixing-vessel; or the flow may, by reversing the paddle, be made to ascend in the middle between the diaphragms, and thence pass downward between the diaphragms and the sides of the mixing-vessel. Thus, as the glycerine flows in a constant small stream into the mixed acids in the vessel $w$ a constant current is maintained, and the thorough combination of the acid and glycerine is effected.

By means of the process which I have above described I procure a larger yield of nitro-glycerine, and the temperature of the contents of the mixing-vessel is prevented from rising to a dangerous degree.

Having thus described my improvement,

What I claim as my invention, and desire to secure by Letters Patent, in the manufacture of nitro-glycerine, is—

1. The process of mixing glycerine and mixed acids to form nitro-glycerine by introducing the glycerine into a bath of mixed acids, (nitric and sulphuric,) in which a rapid circulation of the fluid contents of the bath is maintained, substantially as and for the purposes described.

2. The apparatus, hereinbefore described, for the manufacture of nitro-glycerine, consisting of a mixing-vessel, having a diaphragm or diaphragms, in combination with a paddle-wheel for creating and sustaining a rapid circulation of the fluid contents of the mixing-vessel, substantially as and for the purposes hereinbefore described.

3. The mixing-vessel, traversed by hollow diaphragm or diaphrams, communicating with an exterior and surrounding vessel or reservoir of water, for the purpose of making nitro-glycerine, substantially as hereinbefore described.

E. A. L. ROBERTS.

Witnesses:
W. BAKEWELL,
T. C. BRECHT.